(12) United States Patent
Matsuzaki et al.

(10) Patent No.: US 8,762,001 B2
(45) Date of Patent: Jun. 24, 2014

(54) TRACTOR

(75) Inventors: Akihiro Matsuzaki, Sakai (JP); Kenichi Iwami, Sakai (JP); Toshimitsu Yazaki, Sakai (JP); Atsushi Hayashi, Nara (JP); Shinnosuke Ishikawa, Sakai (JP)

(73) Assignee: Kubota Corporation, Osaka (JP)

( * ) Notice: Subject to any disclaimer, the term of this patent is extended or adjusted under 35 U.S.C. 154(b) by 18 days.

(21) Appl. No.: 13/419,513

(22) Filed: Mar. 14, 2012

(65) Prior Publication Data

US 2012/0245795 A1    Sep. 27, 2012

(30) Foreign Application Priority Data

Mar. 22, 2011    (JP) ................................. 2011-062341

(51) Int. Cl.
*B60G 17/016* (2006.01)

(52) U.S. Cl.
USPC ......................................................... 701/38

(58) Field of Classification Search
USPC ......................................................... 701/38
See application file for complete search history.

(56) References Cited

U.S. PATENT DOCUMENTS

| | | | | |
|---|---|---|---|---|
| 4,715,012 | A | * | 12/1987 | Mueller, Jr. ..................... 701/50 |
| 5,190,111 | A | * | 3/1993 | Young et al. ....................... 172/7 |
| 6,009,354 | A | * | 12/1999 | Flamme et al. ............... 700/184 |
| 6,145,859 | A | | 11/2000 | Altherr et al. |
| 6,196,327 | B1 | | 3/2001 | Patel et al. |
| 2003/0085042 | A1 | | 5/2003 | Rogala |
| 2004/0026880 | A1 | | 2/2004 | Bundy |
| 2008/0257570 | A1 | * | 10/2008 | Keplinger et al. ................ 172/9 |
| 2010/0168959 | A1 | | 7/2010 | Iwami et al. |
| 2013/0087421 | A1 | | 4/2013 | Iwami et al. |

FOREIGN PATENT DOCUMENTS

| | | |
|---|---|---|
| DE | 4242448 C1 | 3/1994 |
| DE | 4308460 A1 | 9/1994 |
| EP | 0381788 A1 | 8/1990 |
| EP | 0518226 A1 | 12/1992 |
| EP | 0670230 A2 | 9/1995 |
| EP | 1388279 A1 | 2/2004 |
| JP | 1320303 A | 12/1989 |
| JP | 6286446 A | 10/1994 |
| JP | 2005143443 A | 6/2005 |
| JP | 2009120128 A | 6/2009 |
| JP | 2009255697 A | 11/2009 |
| JP | 2010162938 A | 7/2010 |

* cited by examiner

*Primary Examiner* — Behrang Badii
*Assistant Examiner* — Daniel L Greene
(74) *Attorney, Agent, or Firm* — The Webb Law Firm

(57) ABSTRACT

A tractor is provided for suppressing pitching in which a front part of a traveling vehicle body is lifted upward, while a suspension mechanism functions when work is carried out with a ground implement. When a raise control signal for raising the plow is detected in draft control for elevating/lowering the plow based on a draw load value detected by a draw load sensor, mode switching means suppresses or limits the suspension function, via control of the suspension control means to suppress an event in which the front part of the traveling vehicle body is lifted upward. When the raise control signal is not detected, the mode switching means causes the suspension mechanism to function via control of the suspension control means.

14 Claims, 9 Drawing Sheets

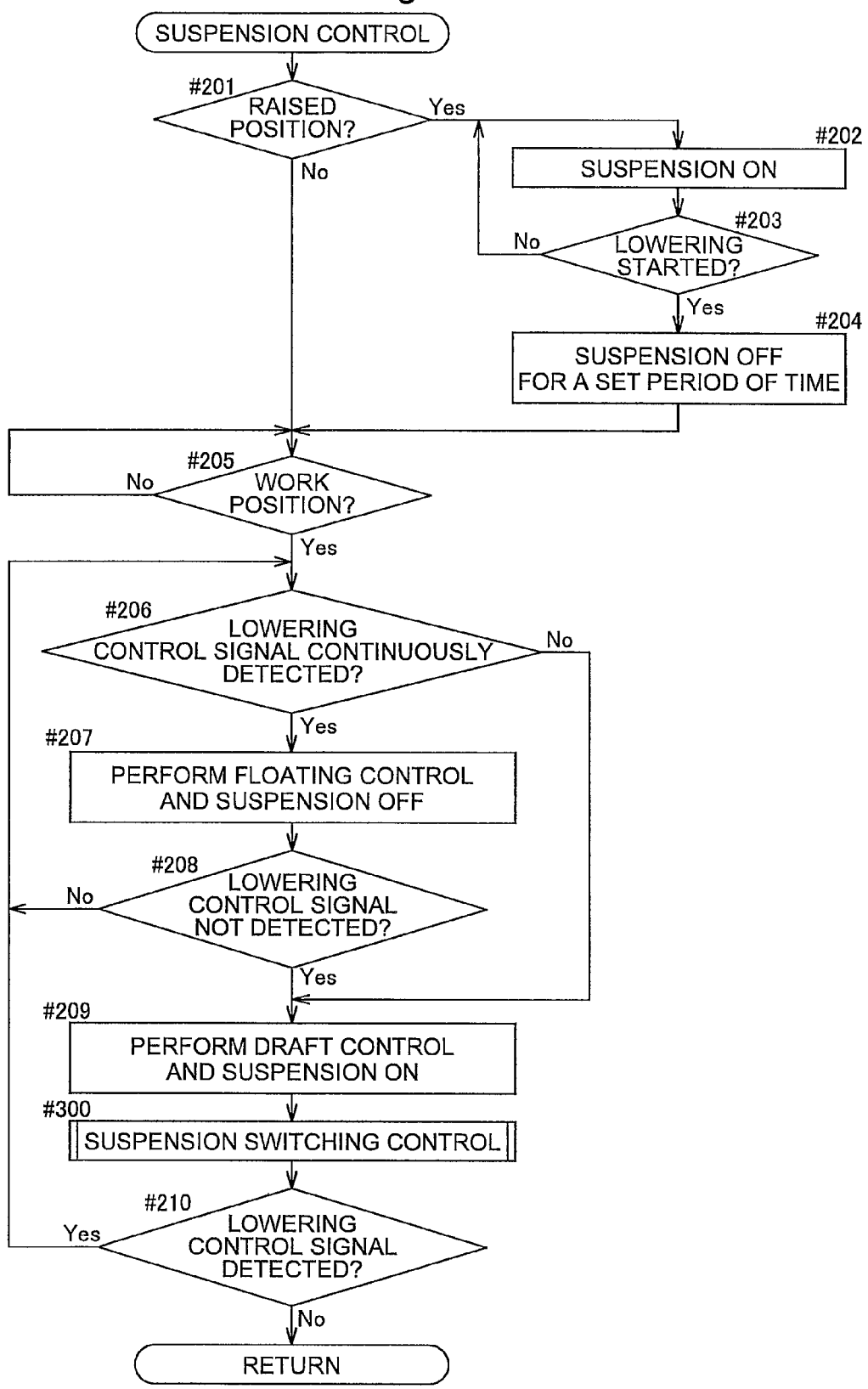

TRACTOR

BACKGROUND OF THE INVENTION

1. Field of the Invention

The present invention relates to a tractor in which front wheels are supported by a suspension mechanism.

2. Description of the Related Art

Japanese Laid-open Patent Application No. 2009-255697 (JP 2009-255697 A) discloses, as a tractor configured in the manner described above, a suspension mechanism provided with: a hydraulic cylinder in which the front wheels and front axle case are supported by a traveling vehicle body so as to be capable of moving vertically, and which extends and contracts in coordination with the vertical movement of the right and left front wheels; a fluid line system for controlling the hydraulic fluid fed to and discharged from the hydraulic cylinder; and an accumulator provided to the fluid line system.

In JP 2009-255697 A, a control mode is described in which the fluid line system includes a switching valve having an orifice part that limits the flow rate of hydraulic fluid that flows to the accumulator when the hydraulic cylinder contracts, and an orifice of the switching valve is selected by the weight of an implement coupled to the traveling vehicle body, whereby the spring constant of the hydraulic cylinder is set as desired. Also, in JP 2009-255697 A, a control mode is described in which the feed and discharge of hydraulic fluid to and from the hydraulic cylinder is limited by an operation that further reduces (the cross section of) the orifice of the switching valve to suppress the vertical movement of the front part of the vehicle body when a brake operation is carried out.

SUMMARY OF THE INVENTION

A tractor occasionally travels at high speed on a road, and there is a need for a suspension mechanism for increasing riding comfort. As described in JP 2009-255697 A, in a suspension mechanism that includes a hydraulic cylinder that extendably and contractably act in accompaniment with the rise and fall of the front wheels and that includes a fluid line system that feeds and discharges hydraulic fluid to the hydraulic cylinder, a coil spring is not required, the spring constant of the suspension function can be readily modified, and more advantageous effects are realized in comparison with the use of a coil spring to constitute a suspension mechanism.

In the particular case that a plow or other ground implement is coupled to the traveling vehicle body to perform work, the travel speed of the vehicle body may on occasion be set to a high speed, and the suspension mechanism needs to be effective in functioning even when a plow or other ground implement is coupled to the traveling vehicle body to perform work.

In an example of the draft control in which tilling work is carried out using a plow, the draw load of the plow is detected by a draw load sensor or the like, and when the draw load value detected by the draw load sensor has exceeded a set value, the plow is raised by actuation of a lift actuator to reduce the draw load. However, when the raising of the plow is started by the draft control, it is possible to envision a situation in which a force operates in the direction of lifting the front part of the traveling vehicle body due to a reaction force that accompanies the raising of the plow, which leads to a phenomenon in which the traveling vehicle body is pitched and riding comfort is degraded.

In other words, there is a need for effectiveness in causing the suspension mechanism to function even when a plow or other ground implement is coupled to the traveling vehicle body to perform work, and there is room for improvement in regard to the high incidence of adverse events where the traveling vehicle body is made to pitch because the suspension mechanism is functioning when the ground implement is raisably actuated.

An object of the present invention is to rationally configure a tractor in which it is possible to control pitching of the traveling vehicle body caused when the ground implement is elevatably actuated while the suspension is caused to function effectively during work performed by the ground implement.

SUMMARY OF THE INVENTION

The above object is fulfilled according to one aspect of the present invention as under:

A tractor comprising:

a traveling vehicle body, the traveling vehicle body having front wheels, the traveling vehicle body being configured to have a ground implement connected thereto;

a lift actuator for elevating/lowering the ground implement coupled to the traveling vehicle body;

a suspension mechanism for supporting the front wheels; and mode switching means for selecting one of a suspension suppression mode and a suspension function mode with respect to the suspension mechanism, wherein a suspension function of the suspension mechanism is limited or stopped in the suspension suppression mode, and a suspension function of the suspension mechanism is activated in the suspension function mode, wherein the mode switching means is configured to select the suspension suppression mode based on detection of a raise control signal for raisably actuating the lift actuator, and to select the suspension function mode based on non-detection of the raise control signal.

According to the aspect described above, the mode-switching means selects the suspension function mode to thereby cause the suspension mechanism to effectively function and improve riding comfort when the raise control signal for raisably actuating a ground implement is not detected. When the raise control signal has been detected, the mode-switching means limits or stops the functioning of the suspension mechanism, and even when the front part of the traveling vehicle body is displaced in the upward lifting direction in accompaniment with the raising of the ground implement, an action in which the front wheels descend is suppressed, the weight of the front wheels and associated areas is made to act on the front part of the traveling vehicle body, and a phenomenon in which the front part of the traveling vehicle body is lifted up is suppressed. When the raise control signal thereafter returns to a non-detected state, the mode-switching means selects the suspension function mode to restore the suspension mechanism to an effective functioning state.

As a result, the tractor is configured to suppress pitching of the traveling vehicle body and maintain good riding comfort when the ground implement is raisably controlled while the suspension is caused to effectively function and achieve good riding comfort during work using a ground implement.

According to another aspect of the present invention:—

A tractor comprising:

a traveling vehicle body, the traveling vehicle body having front wheels, the traveling vehicle body being configured to have a ground implement connected thereto;

a lift actuator for elevating/lowering the ground implement coupled to the traveling vehicle body;

a suspension mechanism for supporting the front wheels; and mode switching means for selecting one of a suspension suppression mode and a suspension function mode with respect to the suspension mechanism, wherein a suspension function of the suspension mechanism is limited or stopped in the suspension suppression mode, and a suspension function of the suspension mechanism is activated in the suspension function mode, wherein the mode switching means is configured to select the suspension suppression mode for a set period of time from detection of a raise control signal for raisably actuating the lift actuator, and to select the suspension function mode after lapse of the set period of time.

According to the aspect described above, the mode-switching means selects the suspension function mode to cause the suspension mechanism to effectively function and improve riding comfort when the raise control signal for raisably actuating a ground implement is not detected. When the raise control signal has been detected, the mode switching means limits or stops the functioning of the suspension mechanism for a set period of time from the detection, and even when the front part of the traveling vehicle body is displaced in the upward lifting direction in accompaniment with the raising of the ground implement, an action in which the front wheels descend is suppressed, the weight of the front wheels and associated areas is made to act on the front part of the traveling vehicle body, and a phenomenon in which the front part of the traveling vehicle body is lifted up is suppressed. After the set period of time from detection of the raise control signal has elapsed, the mode-switching means selects the suspension function mode to thereby restore the suspension mechanism to an effective functioning state. As a result, the tractor is configured to suppress pitching of the traveling vehicle body and maintain good riding comfort for a set period of time when the ground implement is raisably controlled while the suspension is caused to effectively function and achieve good riding comfort during work using a ground implement.

In one preferred embodiment:
the ground implement comprises a drawn soil tiller;
a draw load sensor is provided for detecting a draw load value of the drawn soil tiller in a state in which the drawn soil tiller is coupled to a rear part of the traveling vehicle body;
draft control means is provided for performing draft control by controlling the lift actuator based on the draw load based on the draw load value detected by the draw load sensor; and
wherein the mode switching means is configured to select the suspension suppression mode when the raise control signal has been detected in the draft control.

In accordance with the above, the mode switching means limits or stops the functioning of the suspension mechanism, and suppresses pitching of the traveling vehicle body to maintain good riding comfort when a raise control signal for raising the drawn soil tiller as a ground implement has been detected in the draft control.

In one preferred embodiment:
in a case where a transition has been made from the draft control to forced raising control for raising the drawn soil tiller to a height out of contact with the ground, the mode switching means selects the suspension suppression mode based on detection of the raise control signal.

In accordance with the above, in the particular case that the traveling vehicle body is turned or in other cases in which forced raising control is carried out for raising a drawn soil tiller to a height out of contact with the ground in a state in which the draft control is being carried out, the mode switching means limits or suppresses the function of the suspension mechanism for a set period of time from detection of the raise control signal. The mode switching means limits or stops the functioning of the suspension mechanism, and suppresses pitching of the traveling vehicle body to maintain good riding comfort when the raise control signal been detected.

According to still another aspect of the present invention:—

A tractor comprising:
a traveling vehicle body, the traveling vehicle body having front wheels, the traveling vehicle body being configured to have a ground implement connected thereto;
a lift actuator for elevating/lowering the ground implement coupled to the traveling vehicle body;
a suspension mechanism for supporting the front wheels; and
mode switching means for selecting one of a suspension suppression mode and a suspension function mode with respect to the suspension mechanism, wherein a suspension function of the suspension mechanism is limited or stopped in the suspension suppression mode, and a suspension function of the suspension mechanism is activated in the suspension function mode,
wherein the mode switching means is configured to select the suspension suppression mode while detection of a lowering control signal for lowerably actuating the lift actuator continues, and to select the suspension function mode based on non-detection of the lowering control signal.

In accordance with the above aspect, the mode-switching means selects the suspension function mode to cause the suspension mechanism to effectively function and improve riding comfort when the lowering control signal for lowerably actuating a ground implement is not detected. The mode switching means limits or stops the functioning of the suspension mechanism while detection of the lowering control signal continues, and even when the front part of the traveling vehicle body displaces in the lowering direction in accompaniment with the lowering of the ground implement, the upward lifting of the front wheels is suppressed, and a phenomenon in which the traveling vehicle body is lowered is suppressed. When the state returns to non-detection of the lowering control signal, the mode-switching means selects the suspension function mode to restore the suspension mechanism to an effective functioning state.

As a result, the tractor is configured to suppress pitching of the traveling vehicle body and maintain good riding comfort when the ground implement is lowerably controlled while the suspension is caused to effectively function and achieve good riding comfort during work using a ground implement.

In one preferred embodiment:
the ground implement comprises a drawn soil tiller;
a draw load sensor is provided for detecting a draw load value of the drawn soil tiller in a state in which the drawn soil tiller is coupled to a rear part of the traveling vehicle body;
draft control means is provided for performing draft control by controlling the lift actuator based on the draw load based on the draw load value detected by the draw load sensor; and
wherein a lowering switch part is provided for outputting a lowering control signal for causing the drawn soil tiller to be lowered under gravity in preference to control of the draft control means, the mode switching means selecting the suspension suppression mode in a case where the lowering control signal is continuously outputted from the lowering switch part.

In one preferred embodiment:
the suspension mechanism includes a hydraulic cylinder that extends and contracts in accompaniment with a vertical action of the front wheels, a suspension control unit for controlling feeding of hydraulic fluid to, and discharging of hydraulic fluid from, the hydraulic cylinder, and suspension control means for controlling the suspension control unit; and the mode switching means limits or obstructs feeding of hydraulic fluid to, and discharging of hydraulic fluid from, the hydraulic cylinder according to control of the suspension control means to bring about the suspension suppression mode.

In accordance with the above, the hydraulic cylinder, suspension control unit, and suspension control means are configured to cause the suspension mechanism to function. Therefore, the feeding and discharging of hydraulic fluid to and from the hydraulic cylinder can be limited or stopped to bring about the suspension suppression mode without the addition of a control valve or the like for controlling the hydraulic fluid. This is achieved by making use of the configuration in which the suspension control means is controlled by the mode switching means to control the feeding and discharging of the hydraulic fluid to and from the hydraulic cylinder by the suspension control unit and to thereby cause the suspension mechanism to function.

BRIEF DESCRIPTION OF THE DRAWINGS

FIG. 11 is a flowchart showing still another embodiment of suspension control.

DESCRIPTION OF THE PREFERRED EMBODIMENTS

Embodiments of the present invention will be described hereinafter with reference to the drawings.

Overall Configuration

Figure 1:
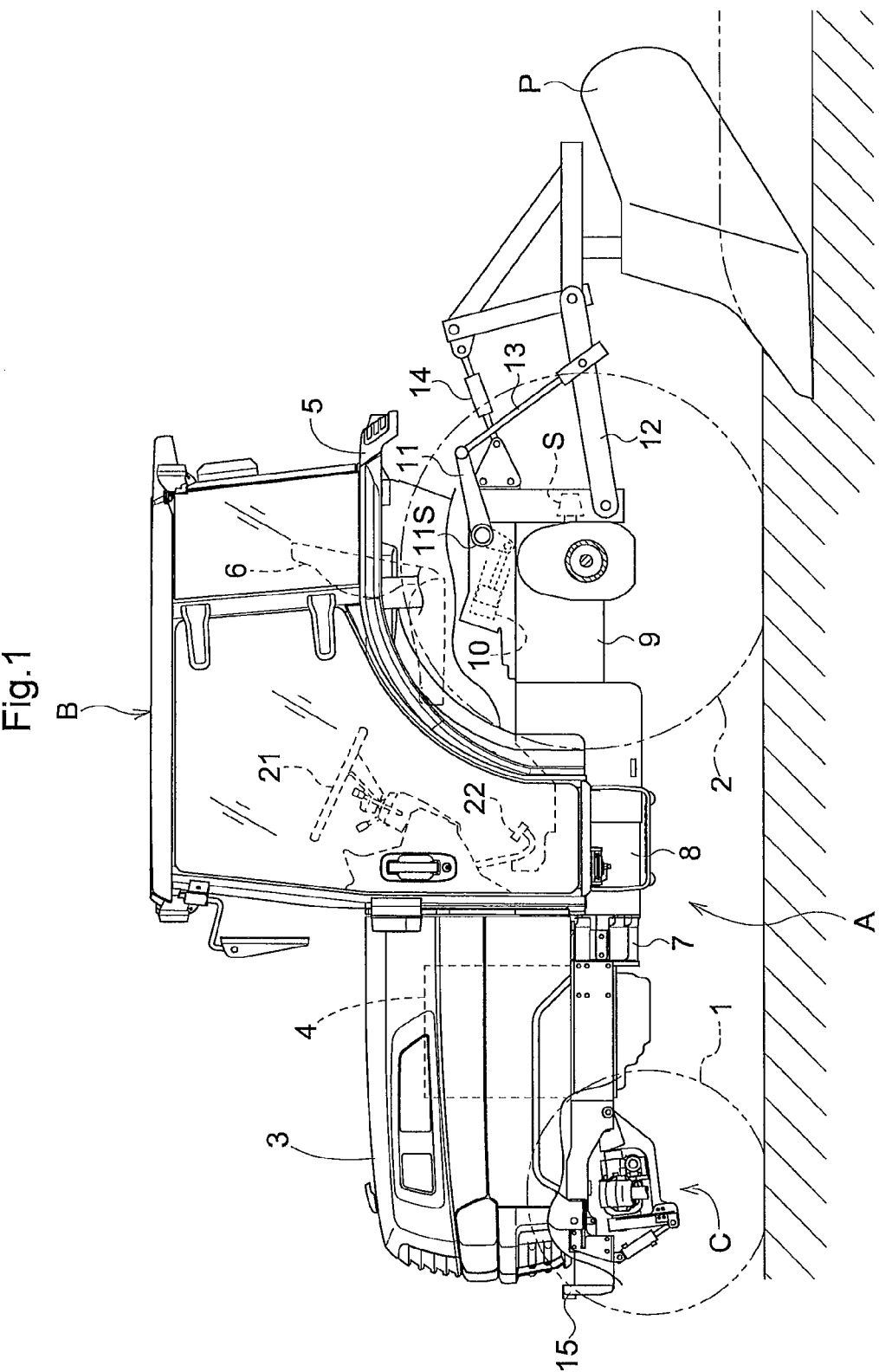
FIG. 1 is a side view of the entire tractor during plowing work.

As shown in FIG. 1, a tractor has a the traveling vehicle body A which includes a pair of right and left front wheels 1 and a pair of right and left rear wheels 2 to together form a travel apparatus. An engine hood 3 houses an engine 4 in the front portion of the traveling vehicle body A, a driver's seat 6 is arranged in an intermediate position between the right and left rear fenders 5, and a cabin B is provided for surrounding the driver's seat 6. In the tractor, each of the pair of front wheels 1 is supported via a suspension mechanism C in order to improve riding comfort.

In the tractor, a clutch housing 7, a center frame 8, and a transmission case 9 are coupled in the stated sequence to the rear side of the engine 4. The transmission case 9 is arranged below the driver's seat 6. A drive system for transmitting drive power from the transmission case 9 to the pair of right and left front wheels 1 and the right and left rear wheels 2 is formed in the traveling vehicle body A, and the tractor thereby comprises a four-wheel drive tractor.

A hydraulic lift cylinder 10 is provided as a lift actuator in a position above the transmission case 9, and a right and left pair of lift arms 11 that swing up and down in accordance with the action of the lift cylinder 10 is provided to the rear end of the transmission case 9.

FIG. 1 shows a configuration in which a plow P as an example of a drawn soil tiller is coupled as a ground implement to the rear part of the traveling vehicle body A via a three-point link mechanism. The three-point link mechanism has a right and left pair of lower links 12 swingably coupled to the rear end lower part of the transmission case 9, a single top link 14 arranged thereabove, and right and left lift rods 13 for supporting the right and left pair of lower links 12 in a state suspended from the swinging ends of the lift arms 11. With this configuration, the plow P is raised by the upward swinging of the lift arms 11 via the three-point link mechanism, and the plow P is lowered by the downward swinging of the lift arms 11 via the three-point link mechanism. The lift cylinder 10 is a single-acting cylinder that causes drive force to act when the plow P is raised, and allows the plow P to descend under gravity when the plow P is lowered.

A shaft body (not shown) composed of a steel material is coupled in a horizontal orientation to the base ends of the respective, right and left lower links 12, and the shaft body is configured to elastically deform when a draw load (traction load) acts on the plow P and the lower links 12 are displaced in the rearward direction. The transmission case 9 includes a draw load sensor S composed of a strain gauge and a differential transformer or the like so as to detect the draw load value from the amount of elastic deformation of the shaft body. In draft control (to be described later), control for raising the plow P is carried out based on the draw load value detected by the draw load sensor S.

Figure 4:
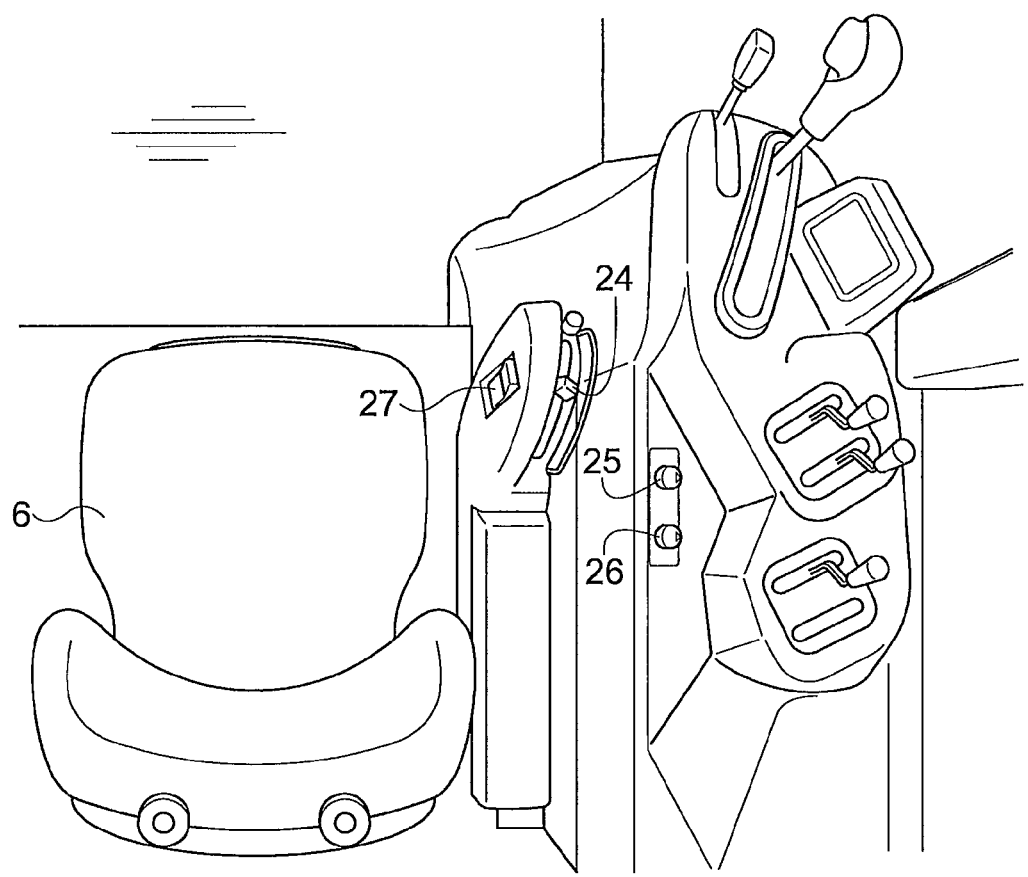
FIG. 4 is a plan view showing the arrangement of the position lever and other components.
Figure 6:
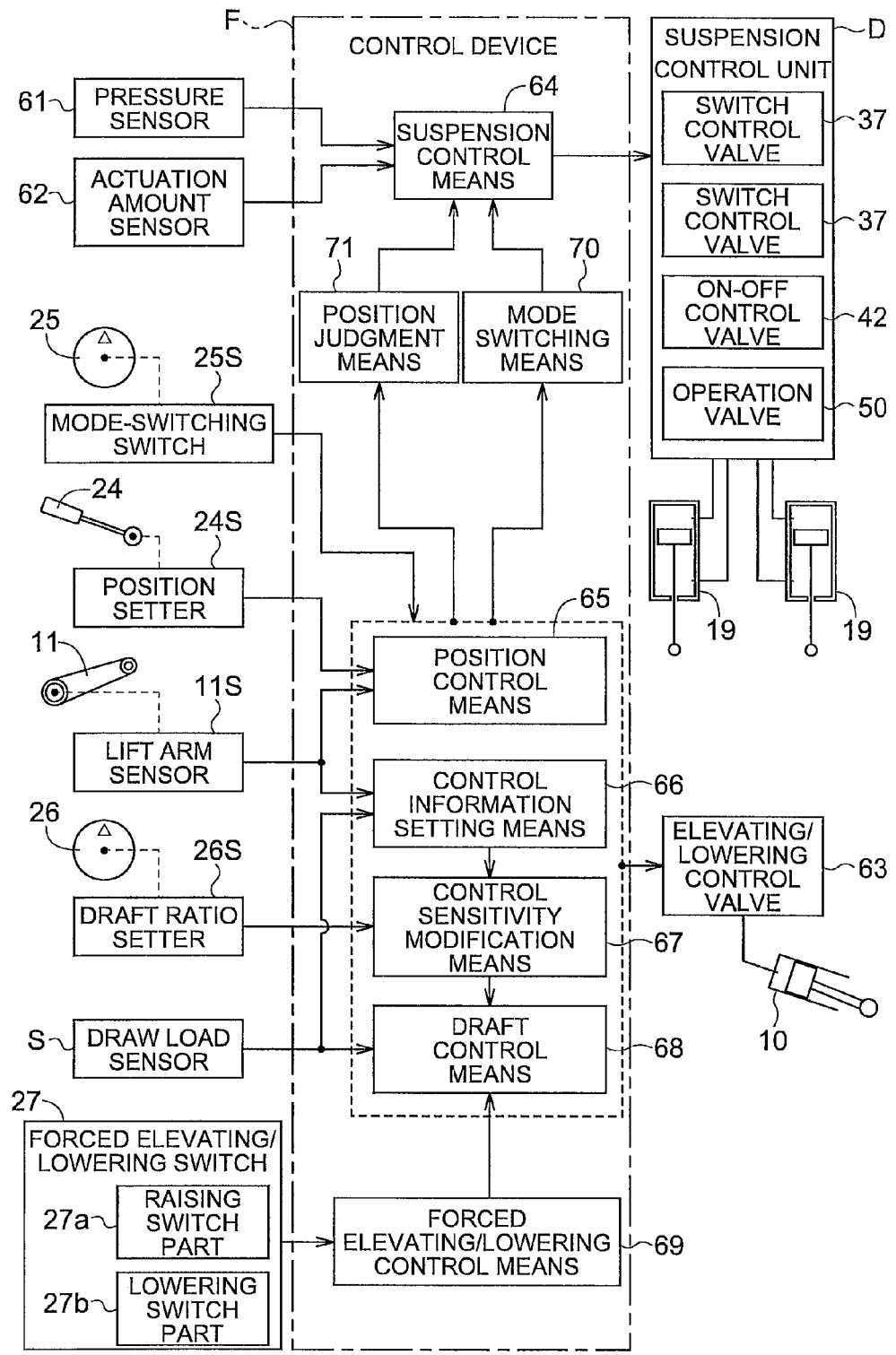
FIG. 6 is a block circuit diagram showing the control system.

The cabin B is generally structured having a front glass in the front part; a pair of right and left doors, each formed of transparent glass or transparent resin and operable to be laterally opened and closed; and a roof in the upper part. A steering wheel 21 for carrying out steering operations (steering) is arranged in a position in front of the driver's seat 6, and a clutch pedal 22 and a brake pedal (not shown) are arranged in respective positions below the steering wheel 21. As shown in FIG. 4, a position lever 24 is arranged in the operation panel of the right-side part of the driver's seat 6 for elevatably controlling a plow P or other implement. And, there are also provided a mode-switching dial 25 for selecting either of the control modes between the position control and the draft control, a draft ratio setting dial 26 for setting the sensitivity of elevation control in the draft control, and a forced elevating/lowering switch 27 for forcibly elevating/lowering the plow P or other implement. The forced elevating/lowering switch 27 includes a press-operated raising switch part 27a and lowering switch part 27b, as shown in FIG. 6. The forced raising control for raising the plow P to a height set in advance in relation to the vehicle body is achieved by momentarily operating the raising switch part 27a during the draft control, and the forced lowering control for lowering and returning the plow P to the draft control is achieved in the raised state by momentarily operating the lowering switch part 27b.

Suspension Mechanism

Figure 2:
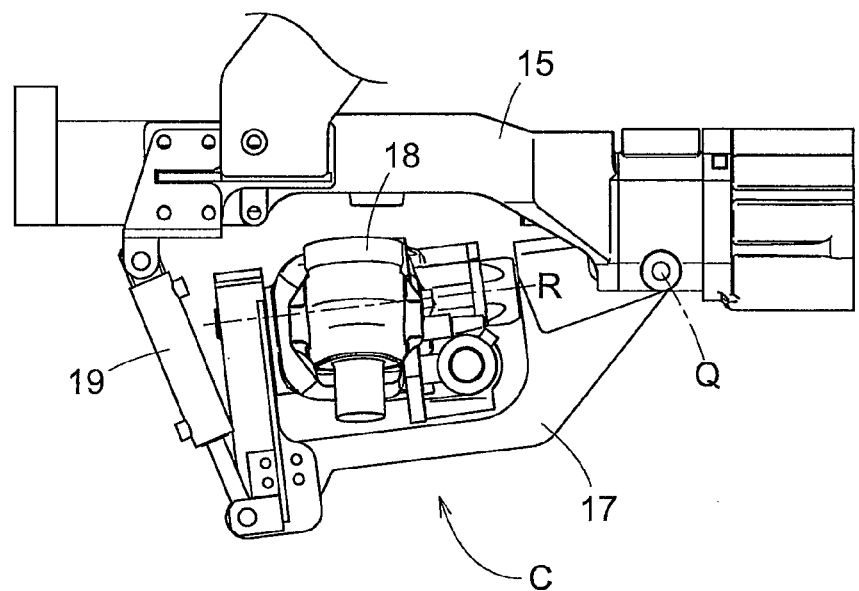
FIG. 2 is a side view showing the support bracket and the like of the suspension mechanism.
Figure 3:
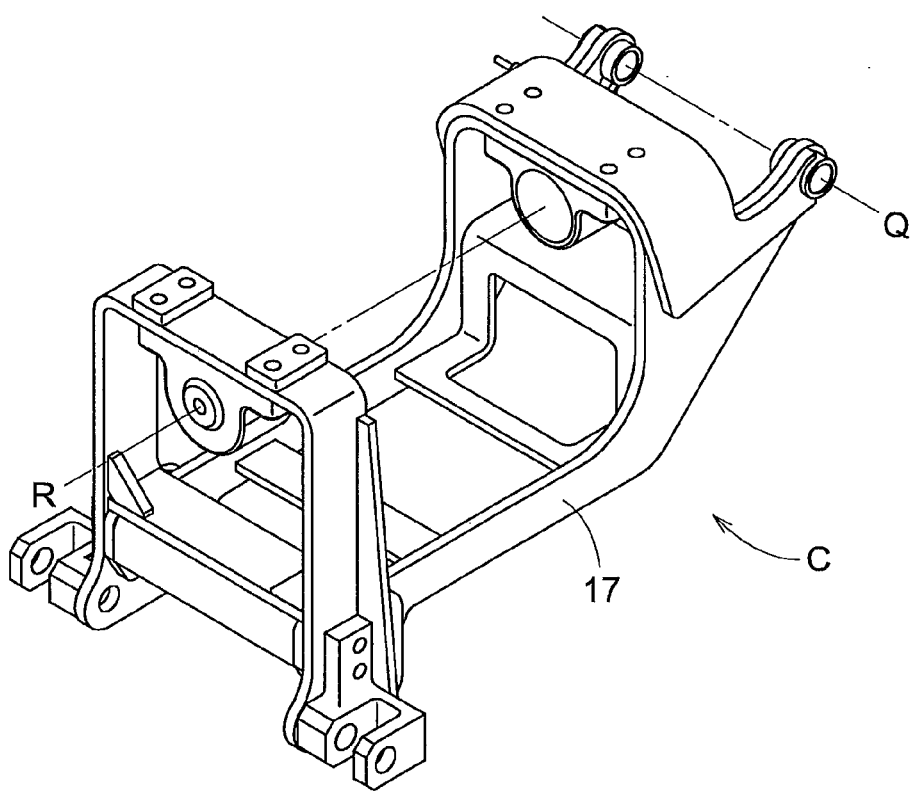
FIG. 3 is a perspective view of the support bracket of the suspension mechanism.

As shown in FIGS. 1 to 3, a front part frame 15 that supports the engine 4 is arranged in the front part position of the traveling vehicle body A, and the rear end of a support bracket 17 is supported below the front part frame 15 to be swingable about a pivot axis Q extending in a right/left orientation. A front axle case 18 is supported by the support bracket 17 to be rollable about a rolling axis R extending in a fore/aft orientation. A drive system for transmitting travel drive power to the front axle case 18 is connected via a universal joint or the like, and the front wheels 1 are provided to the two end parts of the front axle case 18.

Hydraulic cylinders 19 are provided between the front part frame 15 and the right/left positions of the front end of the support bracket 17. These two hydraulic cylinders 19 are provided so as to be capable of extending and contracting in coordination with the vertical movement of the front wheels 1; and hydraulic fluid that is fed and discharged during extension and contraction is controlled, whereby these two hydraulic cylinders 19 function as a suspension. In this manner, the above-described suspension mechanism C is composed of the support bracket 17, the front axle case 18, and the two hydraulic cylinders 19. A suspension control unit D composed of the hydraulic circuit as shown in FIG. 5 is provided to the traveling vehicle body A in order to control the hydraulic fluid that is fed to and discharged from the two hydraulic cylinders 19.

(Suspension Control Unit)

Figure 5:
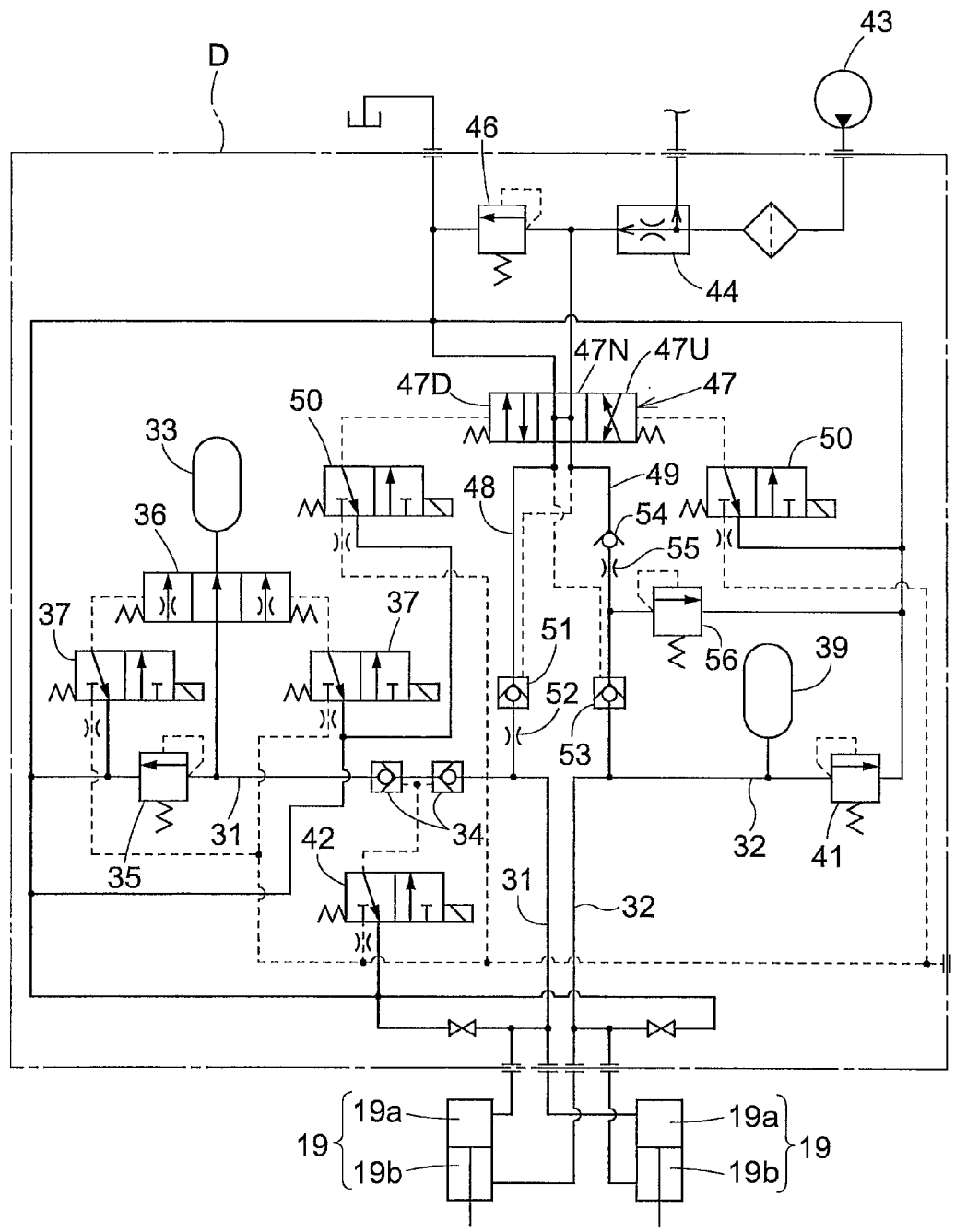
FIG. 5 is a hydraulic circuit diagram of the suspension control unit.

As shown in FIGS. 2 and 5, the hydraulic cylinders 19 are provided in an orientation in which the respective piston rods protrude downward, a first fluid line 31 of the suspension control unit D is connected to a first fluid chamber 19a, and a second fluid line 32 of the suspension control unit D is connected to a second fluid chamber 19b.

A gas-filled first accumulator 33, a pair of pilot-operated first check valves 34, and a first relief valve 35 for protecting the hydraulic circuit are connected to the first fluid line 31; and a pilot-operated switching valve 36 is provided to the fluid line that links a first accumulator 33 and the first fluid line 31. The switching valve 36 is configured to be operable among a first position that does not include a restriction function (or that includes an orifice part having a "large" bore diameter), a second position that includes an orifice part having a "medium" bore diameter, and a third position that includes an orifice part having a "small" bore diameter; and two switch control valves 37 are provided for operating the switching valve 36 by pilot-pressure control.

The first accumulator 33 imparts a spring-like characteristic to the hydraulic cylinders 19 and causes the hydraulic cylinders 19 to function as a suspension. The switching valve 36 controls the flow of the hydraulic fluid fed to and discharged from the first accumulator 33 and thereby has a function for switching the spring constant of the suspension mechanism C. The restriction function of the pilot-operated switching valve 36 is modified depending on the travel speed of the traveling vehicle body A, the weight of the implement provided to the traveling vehicle body A and other conditions, to thereby achieve good riding comfort.

A gas-filled second accumulator 39 and a second relief valve 41 for protecting the hydraulic circuit are connected to the second fluid line 32. Also provided is an on-off control valve 42 for causing pilot pressure to act on the first check valves 34, and the pilot pressure is controlled by the on-off control valve 42 whereby the first check valves 34 are switched between a cutoff state and a communicative state.

When the first check valves 34 reach a cutoff state, the flow of hydraulic fluid in the first fluid line 31 between the first fluid chamber 19a of the hydraulic cylinders 19 and the first accumulator 33 is blocked.

With the suspension control unit D, hydraulic fluid in a hydraulic pump 43 driven by the engine 4 is fed to the pilot-operated main control valve 47 via a flow-dividing valve 44, and a main relief valve 46 for protecting the supply system for hydraulic fluid from the hydraulic pump 43 is connected between the flow-dividing valve 44 and the main control valve 47. A third fluid line 48 is connected from the main control valve 47 across to the portion of the first fluid line 31 that is directly connected to the first fluid chamber 19a, and a fourth fluid line 49 is connected between the main control valve 47 and the portion of the second fluid line 32 that is directly connected to the second fluid chamber 19b.

The main control valve 47 is configured so as to be capable of switching to three positions: a raised position 47U in which hydraulic fluid is fed to the third fluid line 48, a lowered position 47D in which hydraulic fluid is fed to the fourth fluid line 49, and a neutral position 47N in which hydraulic fluid is neither fed nor discharged; and also provided are two operation valves 50 for causing pilot pressure to act on and operate the main control valve 47.

A pilot-operated second check valve 51 and a restrictor 52 are provided to the third fluid line 48. A pilot-operated third check valve 53, a fourth check valve 54 that opens and closes merely under hydraulic fluid pressure, and a restrictor 55 are provided to the fourth fluid line 49. A fourth relief valve 56 is connected between the third check valve 53 and the fourth check valve 54 in the fourth fluid line 49.

The two switch control valves 37, the on-off control valve 42 and the operation valves 50 as described above are solenoid-operated valves and are controlled by a control device F as shown in FIG. 6.

(Control Configuration)

As shown in FIG. 6, each of the hydraulic cylinders 19 includes a pressure sensor 61 for detecting the pressure of the first fluid chamber 19a and an actuation amount sensor 62 for detecting length thereof. The lift cylinder 10 is configured so that hydraulic fluid is fed and discharged by a solenoid-operated elevating/lowering control valve 63; and a lift arm sensor 11S is provided in the base end position of the lift arms 11 for detecting, from the swing angle of the lift arms 11, the height of the plow P or other implement in relation to the vehicle body.

A control device F having a microprocessor, a digital signal processor (DSP) or other digital processing system is provided to the traveling vehicle body A so as to control the suspension control unit D and the elevating/lowering control valve 63. The control device F includes software-constituted suspension control means 64, position control means 65, control information setting means 66, control sensitivity modification means 67, draft control means 68, forced elevating/lowering control means 69, mode switching means 70, and position judgment means 71.

The suspension control means 64 outputs a control signal to the suspension control unit D to control the suspension mechanism C. The position control means 65 carries out the position control for elevating/lowering the plow P or other implement to a position that corresponds to the operation position of the position lever 24. The control information setting means 66 carries out processing for setting control information G (see FIG. 9) that is used for setting the level of the plow P in relation to the vehicle body during the draft control. The control sensitivity modification means 67 sets the control sensitivity in the control information G based on information from a draft ratio setter 26S. The draft control means 68 carries out the draft control for controlling the level of the plow P based on the control information G and the draw load value detected by the draw load sensor S. The forced elevating/lowering control means 69 carries out the forced elevating/lowering control of the plow P by operation of the forced elevating/lowering switch 27.

The mode switching means 70 selects the suspension function mode based on non-detection of an elevation control signal, and selects the suspension suppression mode based on detection of the elevation control signal, and then provides the suspension control means 64 with the information thus selected. The mode switching means 70 selects the suspension suppression mode also when the lowering control signal produced by operation of the lowering switch part 27b of the forced elevating/lowering switch 27 is detected, when the lowering control signal produced by the position lever 24 is detected, and when a later-described floating control is carried out; and provides the suspension control means 64 with the information thus selected. The position judgment means 71 provides the suspension control means 64 with the information for switching over the modes of suspension between the suspension function mode and the suspension suppression mode, based on the level of the plow P in relation to the vehicle body.

Each of the suspension control means 64, the position control means 65, the control information setting means 66, the control sensitivity modification means 67, the draft control means 68, the forced elevating/lowering control means 69, the mode switching means 70 and the position judgment means 71 is provided in form of software, but may be in form of hardware or a combination of hardware and software instead.

The control device F receives signals from the pressure sensor 61, the actuation amount sensor 62, a mode-switching switch 25S operated by the mode-switching dial 25, a position setter 24S for detecting the operation position of the position lever 24, a lift arm sensor 11S, the draft ratio setter 26S operated by the draft ratio setting dial 26, the draw load sensor S and the forced elevating/lowering switch 27. The control device F outputs a control signal to the two switch control valves 37, the on-off control valve 42, and the operation valves 50 of the suspension control unit D, and also outputs a control signal to the elevating/lowering control valve 63.

The control device F controls the elevation of the plow P or other implement by the position control, controls the elevation of the plow P by the draft control, and switches over the mode of the suspension mechanism C between the suspension function mode for causing the suspension mechanism C of the front wheels 1 to effectively function when the plow P or other implement is raised to a raising limit position or to a raised position near the limit position (a height out of contact with the ground) and the traveling vehicle body A is made to travel, and the suspension suppression mode for suppressing the functioning of the suspension mechanism C when predetermined conditions have been met.

(Overview of Position Control)

In the position control, the position control means 65 sets a target level of the implement in relation to the vehicle body based on a signal from the position setter 24S when the position lever 24 has been operated by a worker; and controls the elevating/lowering control valve 63 so that the lift arms 11 are actuated in a direction that causes conformity between a target level value in relation to the vehicle body, and a lift arm angle detected by the lift arm sensor 11S (a value of the level of the implement in relation to the vehicle body). The position control elevatably brings the plow P or other implement to the level in relation to the vehicle body that corresponds to the operated position of the position lever 24.

(Overview of Forced Elevating/Lowering Control)

The forced elevating/lowering control means 69 sets the value of the target level in relation to the vehicle body for forcibly raising the implement to the limit position or near limit position of raising the implement. When the raising switch part 27a of the forced elevating/lowering switch 27 is temporarily operated during the draft control, the forced elevating/lowering control means 69 carries out control based on the position control in which the lift arms 11 are actuated in a direction that causes conformity between a target level value for the forced raising in relation to the vehicle body, and a lift arm angle detected by the lift arm sensor 11S (a value of the level of the implement in relation to the vehicle body). On the other hand, when the lowering switch part 27b of the forced elevating/lowering switch 27 has been temporarily operated with the plow P being in a raised position after the forced raising of the implement, a switch is made from control based on the position control to the draft control; and at the timing of this switching, the detection value of the draw load sensor S is extremely low, and thus control for forcibly lowering the plow P is carried out, and the plow P is lowered to a work position (a level that allows tilling work by the implement) and returned to tilling work. Besides of these controls, control can be switched over to floating control by continuous operation of the lowering switch part 27b to continuously lower the plow P; and in floating control, "deep plowing" work is carried out where the plow P is lowered to a greater tilling depth than the tilling depth produced by the draft control and tilling is performed.

(Overview of Draft Control)

In the draft control, a worker operates the position lever 24 to set the plow P to a target level in relation to the vehicle body (the level below ground surface in relation to the vehicle body, the target tilling depth). In particular, when the draft control is to be started, the worker selects the draft control by the mode-switching dial 25 and then operates the position lever 24 to carry out the operation for lowering the plow P so that the control device F acquires the signal of the position setter 24S and the signal of the draft ratio setter 26S. Based on these signals, the control information G as shown in FIG. 9 is set by the control information setting means 66.

Figure 9:
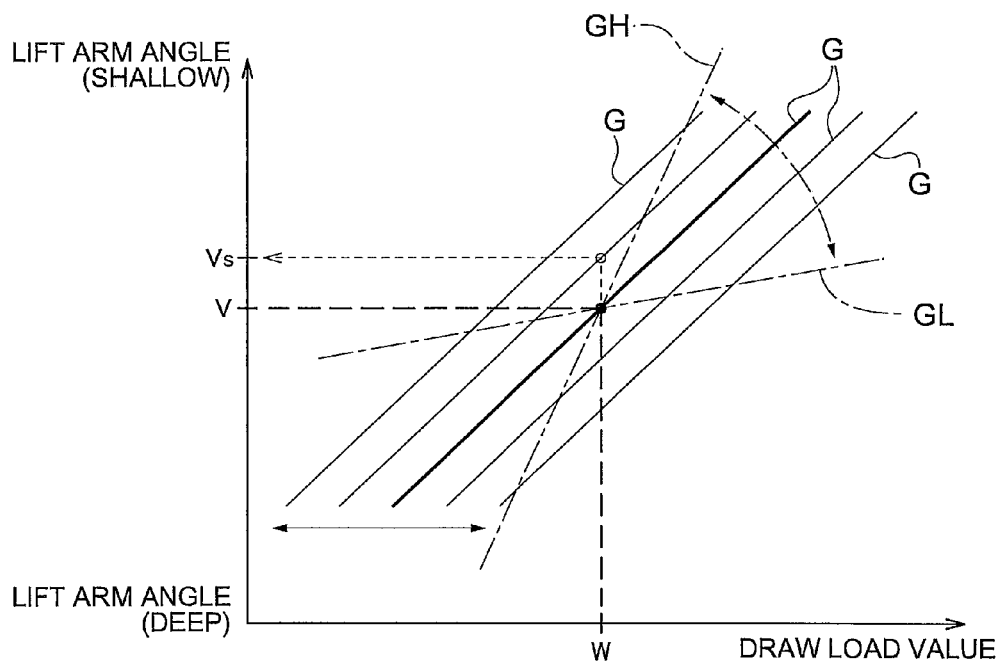
FIG. 9 is a graph showing the control characteristics information.

When the control information G is set in these manners, one of a plurality of sets of the control information G as shown in FIG. 9 that corresponds to the signal of the position setter 24S is set, and the slope of the set control information G is set in correspondence to the setting value of the draft ratio setter 26S. FIG. 9 shows a target level V (target tilling depth) in relation to the vehicle body when the control information G is referenced using the draw load value W, and the plow P is elevatably controlled in the draft control to actuate the lift arms 11 so that the target level V (target tilling depth) in relation to the vehicle body and the lift arm angle match each other. When the position lever 24 is operated to a shallower setting, the upper-side control information G is set and the target value Vs in relation to the vehicle body referenced using the same draw load value W is shifted to a shallower setting.

As shown in FIG. 9, the control information G has a data structure that allows the relationship between the draw load value and the lift arm angle (target level in relation to the vehicle body) to be displayed as line shape information, and the control information setting means 66 is capable of setting one of a plurality of sets of control information G. In order to implement this setting, the control information setting means 66 sets a processing mode in which processing is carried out for generating one set of control information G by computation. Instead thereof, the control information setting means 66 may set one of a plurality of control information G stored in storage or the like, based on the target level V in relation to the vehicle body and on the setting signal from the draft ratio setter 26S, for example.

When the draft ratio setting dial 26 has been operated, the slope of the control information G shown as line-shape information is modified and the control sensitivity is modified by this modification. In other words, the draft control may be regarded as a mixture of the position control component, and the draft control component which is conventionally taken account of. When the draft ratio setting dial 26 is operated in a direction that increases the ratio of the draft control, control information GH having high sensitivity indicated by a steep slope in FIG. 9 is set. Conversely, when the draft ratio setting dial 26 is operated in a direction that reduces the draft ratio, control information GL having low sensitivity indicated by a gradual slope (approaching horizontal) in the drawing is set. The control information GH with high sensitivity and the control information GL with low sensitivity shown in FIG. 9 are typical examples, and the control sensitivity (slope) of each can be set as desired by operation of the draft ratio setting dial 26.

(Overview of Suspension Control)

In this tractor, the draft control can be carried out while the suspension function mode for causing the suspension mechanism C to function has been set. During the draft control, when control is carried out that may cause the traveling vehicle body A to pitch, such as one to increase the draw load value of the plow P for rasing the plow P, control is carried out for setting the mode to the suspension suppression mode in which the function of the suspension mechanism C is limited or stopped.

In other words, the suspension mechanism C is made to function during travel in the draft control to create a comfortable ride. However, when control for raising the plow P is carried out, for example, the reaction force resulting from this raising acts in the direction of lifting the front part of the traveling vehicle body A upward, leading to pitching of the traveling vehicle body A and to a less comfortable ride. For suppressing this drawback, the suspension mechanism C is set to the suspension suppression mode when a raise control signal generated by the draft control means 68 is detected, whereby and control is carried out so that the weight of the suspension mechanism C and the front wheels 1 is made to act on the front part of the traveling vehicle body A for suppressing the upward lifting of the front part of the traveling vehicle body A.

(Control Mode)

Figure 7:
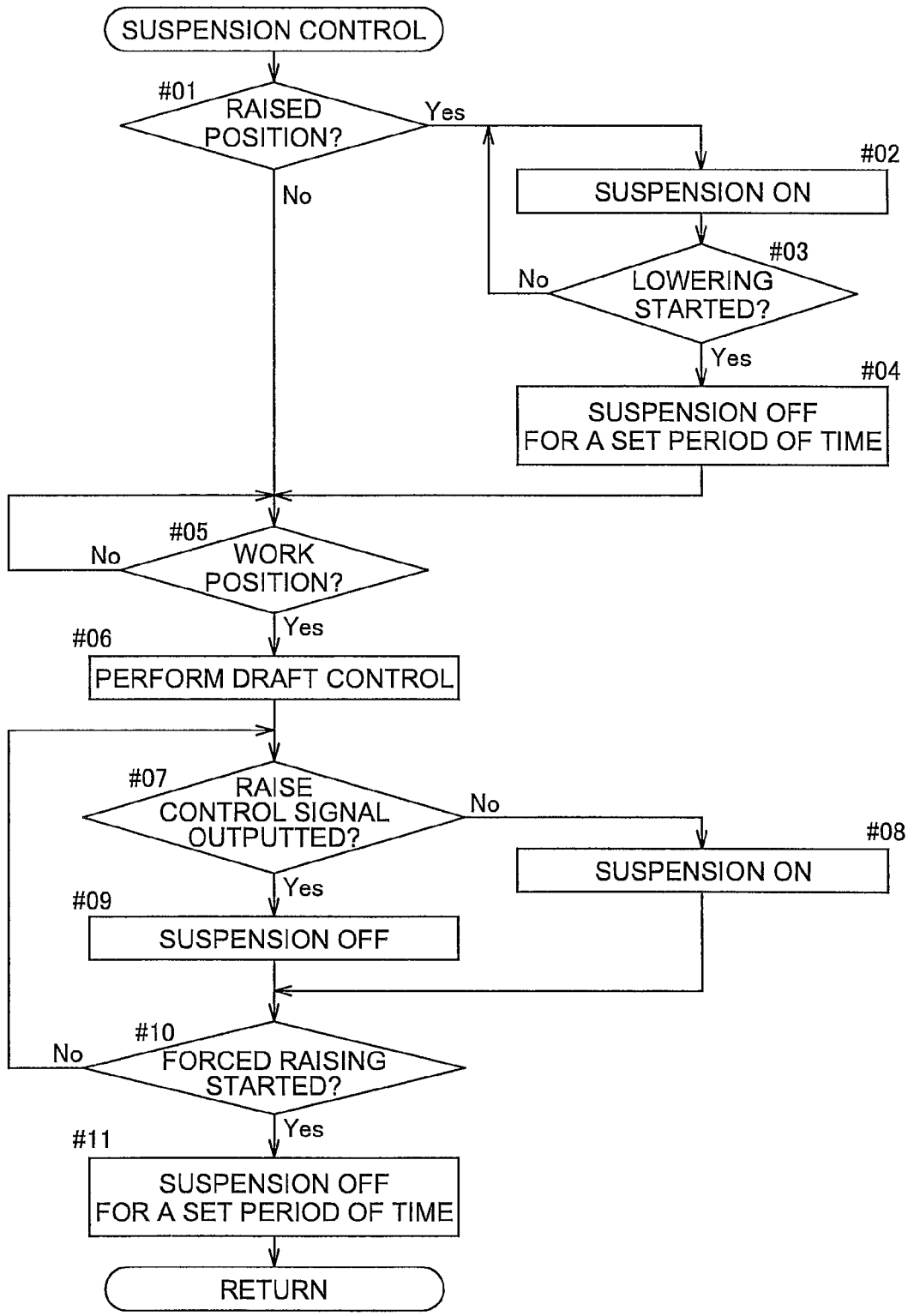
FIG. 7 is a flowchart of suspension control.

FIG. 7 shows a flowchart outlining suspension control by the control device F. Suspension control envisions a control mode in which the position control is carried out with the plow P in a raised position at the limit position of raising or near the limit position of raising, and in which the draft control is carried out with the plow P in a work position in contact with the ground. When the plow P is judged to be in a raised position in suspension control, control is carried out in the suspension function mode for causing the suspension mechanism C to function (in the flowchart, Suspension ON), and the suspension function mode is continued until the lowering of the plow P is started (steps #01 to #03).

Figure 10:
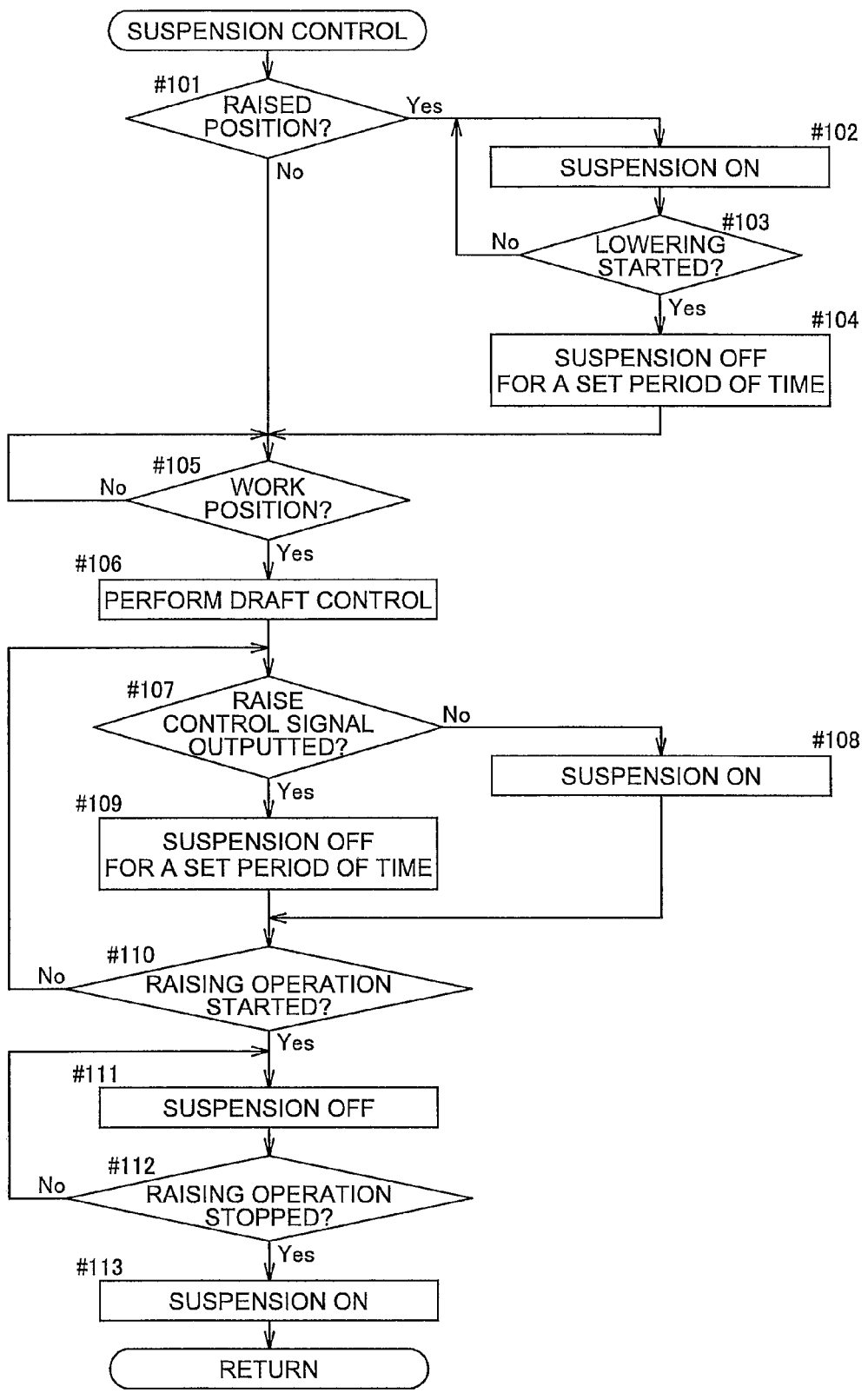
FIG. 10 is a flowchart showing another embodiment of suspension control.

FIGS. 10 and 11 show flowcharts outlining two another embodiments illustrating suspension control. The controls in steps #101 to #108 in another embodiment as shown in FIG. 10 are the same as those in steps #01 to #08 in the present (first) embodiment, and thus description thereof will not be made in repetition. However, different controls will be described separately. Similarly, the controls in steps #201 to #205 in still another embodiment as shown in FIG. 11 are the same as those in steps #01 to #05 in the present (first) embodiment, and thus description thereof will not be made in repetition. However, different controls will be described separately.

The position judgment means 71 judges that the plow P is in a raised position based on a signal from the lift arm sensor 11S, and this information is provided to the suspension control means 64, whereby the control of the suspension function mode is implemented (Suspension ON). In other words, when the plow P is in a raised position at or near the limit position of raising, the plow P may travel out of contact with the road or field. Therefore, the suspension control unit D maintains the suspension function mode (Suspension ON) to thereby achieve travel with good riding comfort.

In the suspension function mode (Suspension ON), pilot pressure is increased by control of the on-off control valve 42 to allow the circulation of hydraulic fluid through the first check valves 34. Hydraulic fluid is fed to and discharged from the first accumulator 33 and the second accumulator 39 to cause the hydraulic cylinders 19 to function as a suspension, and if necessary, the spring constant of the hydraulic cylinders 19 which function as a suspension is modified by controlling the two switch control valves 37. Also, the operation valves 50, the hydraulic pump 43 and the main control valve 47 are controlled to cause the hydraulic cylinders 19 to extend or contract to thereby keep the fore/aft rear slope orientation of the traveling vehicle body A at a target orientation.

Next, when control for lowering the plow P has been started (at the timing indicated by "forced lowering" in FIG. 8), the mode switching means 70 transits to the suspension suppression mode (Suspension OFF in the flowchart) for a set period of time, and the pitching of the traveling vehicle body A is suppressed (steps #03, #04).

When such control is carried out, it is assumed that the position lever 24 is operated to lower the plow P or the forced elevating/lowering switch 27 is operated to lower the plow P. More specifically, the plow P is lowered by the position lever 24a, a lowering control signal is outputted from the position control means 65 to the elevating/lowering control valve 63, and at the timing of detection of the lowering control signal, the mode switching means 70 provides the suspension control means 64 with information for selecting the suspension suppression mode (Suspension OFF) for a set period of time. Similarly, when the plow P is lowered by the forced elevating/lowering switch 27, the position control is switched to the draft control, whereby the lowering control signal is outputted from the draft control means 68 to the elevating/lowering control valve 63, and at the timing of detection of the lowering control signal, the mode switching means 70 provides the suspension control means 64 with information for selecting the suspension suppression mode (Suspension OFF) for a set period of time.

In step #04, the process transits to the suspension suppression mode (Suspension OFF) for a set period of time from the detection of the lowering control signal. Instead thereof, the control mode of the mode switching means 70 may be set so that the process transits to the suspension suppression mode during the traveling vehicle body A travels for a set distance, from a timing when the lowering control signal is detected. The lowering switch part 27b of the forced elevating/lowering switch 27 should be operated in order to lower the plow P which has been raised by the forced elevating/lowering control. However, the draft control is not carried out and floating control is carried out instead when this operation is continued (the switch is continuously pressed). This control mode will be described later.

As described above, when the plow P is lowered by the position lever 24 or the forced elevating/lowering switch 27, the process transits to the suspension suppression mode (Suspension OFF) for a set period of time based on detection of the lowering control signal. Compression action of the hydraulic cylinders 19 in the suspension control unit D is thereby blocked and pitching of the traveling vehicle body A is suppressed. Although not shown in the flowchart, the process transits to suspension suppression mode (Suspension OFF) for a set period of time and the pitching of the traveling vehicle body A is suppressed also when the plow P is slightly lowered by the position lever 24.

Incidentally, as a control mode of transition to the suspension suppression mode (Suspension OFF) when the lowering of the plow P acting as the ground implement is started, it is also possible to set a control mode in which the position judgment means 71 detects that the lowering of the plow P has been started based on a signal of the lift arm sensor 11S, and at the timing of this detection, the position judgment means 71 provides the suspension control means 64 with information for selecting the suspension suppression mode (Suspension OFF).

In the suspension suppression mode (Suspension OFF), pilot pressure is released by control of the on-off control valve 42 so that the circulation of hydraulic fluid is blocked by the first check valves 34, whereby feeding and discharging of hydraulic fluid to and from the hydraulic cylinders 19 is blocked, and the extending and contracting action of the hydraulic cylinders 19 is stopped. In the suspension suppression mode, there is no need to completely block the extending and contracting action of the hydraulic cylinders 19. For example, a fourth position having a restricting part with an extremely small bore diameter may be formed by restructuring the spool of the switching valve 36, and a dedicated operation valve or the like may be provided for operating the switching valve 36 to the fourth position. In this modified configuration, when the process transits to the suspension suppression mode (Suspension OFF), pilot pressure is increased by control of the on-off control valve 42 to allow the circulation of hydraulic fluid through the first check valves 34 and the switching valve 36 is set to the fourth position by the operation valve or the like, whereby the circulation rate of the hydraulic fluid is reduced via the restriction part having a small bore diameter, and the suspension function of the hydraulic cylinders 19 is suppressed.

In the present embodiment, feeding and discharging of hydraulic fluid to and from the hydraulic cylinders 19 is blocked by the first check valves 34. Instead thereof, for example, an electromagnetic on-off valve may be provided on the hydraulic line for feeding and discharging hydraulic fluid to and from the hydraulic cylinders 19, and when the process transits to the suspension suppression mode (Suspension OFF), the on-off valve may be closeably operated to thereby suppress the suspension function of the hydraulic cylinders 19. In this configuration, an electromagnetic variable restrictor valve, an electromagnetic flow rate control valve or the like may be provided on the hydraulic line for feeding and discharging hydraulic fluid to the hydraulic cylinders 19, and when the process transits to the suspension suppression mode (Suspension OFF), the suspension function of the hydraulic cylinders 19 may be suppressed by the variable restrictor valve, the flow rate control valve or the like.

Back to the description of the present embodiment, when the plow P is in the work position (a level that allows tilling work), the draft control means 68 carries out the draft control. In the draft control, the control information G is set in the manner described above, and as shown in FIG. 8, a dead zone E is set with reference to the initial draw load value W. When the draw load value detected by the draw load sensor S has exceeded an upper limit value Eu of the dead zone E, the plow P is raised to a target level value in relation to the vehicle body (lift arm angle) that is obtained using the draw load value with reference to the control information G, so that the draw load value detected by the draw load sensor S keeps the load on the engine 4 within a predetermined range. Conversely, when the draw load value detected by the draw load sensor S has reached a value that is less than a lower limit value Ed of the dead zone E, control is carried out to lower the plow P to a target level value in relation to the vehicle body (lift arm angle) that is obtained using the draw load value with reference to the control information G.

The suspension function mode (Suspension ON) is maintained in particular cases where the draw load value detected by the draw load sensor S falls within the dead zone E and the plow P is not elevatably controlled in the draft control (in the case where the raise control signal is not detected), or where the draw load value has fallen to a value that is less than the lower limit value Ed and the plow P is not lowerably controlled (in the case where the raise control signal is not detected). In contrast, when a raise control signal for raising the plow P has been generated in the draft control means 68 such as when the draw load value detected by the draw load sensor S has exceeded the upper limit value Eu of the dead zone E (the timing indicated by "X" in FIG. 8), a transition is made to the suspension suppression mode (Suspension OFF), and the draw load value falls to a value that is accommodated in the area of the dead zone E so as not to generate raise control signal, whereupon the suspension function mode is restored (Suspension ON) (steps #05 to #09).

Figure 8:
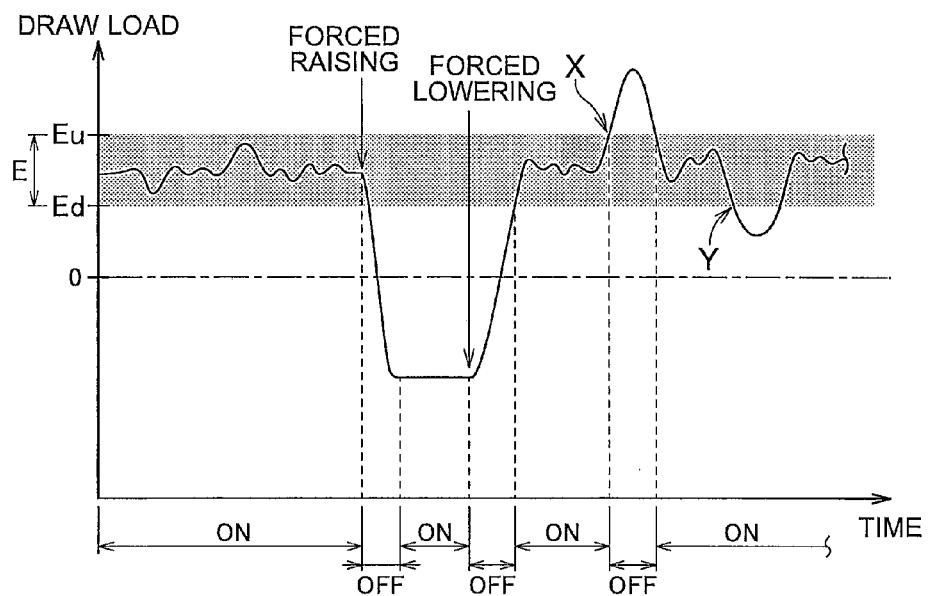
FIG. 8 is a graph showing the relationship between the draw load and the control mode.

Since a draw load acts on the traveling vehicle body A from the plow P in the draft control, the plow P is raisably controlled and the draft control means 68 outputs the raise control signal when the draw load value rapidly increases in a short period of time (the timing indicated by "X" in FIG. 8). When the raise control signal is outputted in this manner, the mode switching means 70 selects the suspension suppression mode (Suspension OFF) at the timing that occurs when the raise control signal is detected, whereby the extending and contracting action of the hydraulic cylinders 19 is limited or stopped. Even if the moment acts in the direction of lifting the front part of the traveling vehicle body A upward due to the reaction force that accompanies the rising action of the plow P, the weight of the front wheels 1, the front axle case 18 and the like is thereby made to act on the front part of the traveling vehicle body A, to suppress pitching that lifts the front part of the traveling vehicle body A upward, as well as the degraded riding comfort.

In the control, in particular, when the draw load value has exceeded the upper limit value Eu of the dead zone E and the draft control means 68 has outputted a raise control signal, the mode switching means 70 detects the raise control signal, and the mode switching means 70 transits to the suspension suppression mode (Suspension OFF) and thereafter carries out control to continuously maintain the suspension suppression mode (Suspension OFF) while detection of the raise control signal continues (steps #07, #08, #09). However, as shown in e.g. step #109 in FIG. 10 as another embodiment, it is also possible set the control mode so that a transition is made to the suspension suppression mode (Suspension OFF) for a set period of time from timing that occurs when the raise control signal is detected, and to restore the suspension function mode (Suspension ON) after a set period of time has elapsed. A period of time that is slightly longer than the time required for the plow P to reach a set height may be envisioned as the set period of time, but the period of time may be a shorter period of time. In step #109, a transition is made to the suspension suppression mode (Suspension OFF) for a set period of time from the detection of the raise control signal, but instead of this control, it is also possible to set a control mode in which a transition is made to the suspension suppression mode in an area where the traveling vehicle body A travels for a set distance, starting from the timing that occurs when the lowering control signal is detected.

As shown in FIG. 7, when control for forcibly raising the plow P is started by operation of the position lever 24 or by operation of the forced elevating/lowering switch 27 when the draft control is being carried out, a transition is made to suspension suppression mode (Suspension OFF) at the timing indicated by "forced raising" in FIG. 8 for a set period of time using this timing as a reference, and the suspension function mode (Suspension ON) is restored after the set period of time has elapsed (steps #10, #11, #01, #02).

Describing such control in greater detail, the raise control signal is outputted from the position control means 65 to the elevating/lowering control valve 63 when the position lever 24 has been operated in the direction for raising the plow P, and at the timing that occurs when the raise control signal is detected, the mode switching means 70 carries out processing to provide the suspension control means 64 with the information for selecting the suspension suppression mode (Suspension OFF) for a set period of time. Similar to this, the raise control signal is outputted from the position control means 65 to the elevating/lowering control valve 63 when a switch is made from the draft control to the position control when an operation for raising the plow P is carried out using the forced elevating/lowering switch 27, and at the timing that occurs when the raise control signal is detected, the mode switching means 70 carries out processing to provide to the suspension control means 64 with the information for selecting the suspension suppression mode (Suspension OFF) for a set period of time.

In step #11, a transition is made to the suspension suppression mode (Suspension OFF) for a set period of time from the detection of the raise control signal, but instead of this control, it is also possible to set the control mode so that a transition is made to the suspension suppression mode in an area where the traveling vehicle body A travels for a set distance, starting from the timing that occurs when the lowering control signal is detected, in the same manner as step #09.

In particular, instead of the control of steps #10, #11, as shown in e.g. steps #110 to #113 of FIG. 10 as another embodiment, it is also possible to set a control mode in which a transition is made to the suspension suppression mode (Suspension OFF) at the start of the raising operation (timing that occurs when the raise control signal is detected) of the position lever 24, and the suspension function mode (Suspension ON) is restored when it has been detected that the raise operation of the position lever 24 has stopped.

As still another control mode similar to the above alternative embodiment, it is also possible to set a control mode in which, when control for raising the plow P to the upper limit position is carried out by the forced elevating/lowering switch 27 in the draft control, a switch is made from the draft control to the position control, a transition is made to the suspension suppression mode (Suspension OFF) at the timing that occurs when the mode switching means 70 has detected the raise control signal from the position control means 65, and the suspension function mode (Suspension ON) is restored at a timing that occurs when the position judgment means 71 has judged that the plow P has reached the raised position (the limit position or near the limit position of raising) based on the signal from the lift arm sensor 11S.

When the plow P has been forcibly raised in the draft control as described above (step #10), a moment acts in the direction of lifting the front part of the traveling vehicle body A upward in accompaniment with the forced raising, and the hydraulic cylinders 19 act in the elongation direction which leads to pitching. In contrast, when the raise control signal for raising the plow P has been detected, the suspension control unit D transits to the suspension suppression mode (Suspension OFF), whereby the elongation action of the hydraulic cylinders 19 is blocked (the suspension mechanism is suppressed); and the weight of the front wheels 1, the front axle case 18 and the like acts on the front part of the traveling vehicle body A, whereby pitching in which the front part of the traveling vehicle body A is lifted upward is suppressed and the drawback in which riding comfort is degraded is suppressed.

Further, as shown in the flowchart of FIG. 11, when the lowering switch part 27b is continuously pressed and detection of the lowering control signal continues when the plow P is lowered by operation of the lowering switch part 27b of the forced elevating/lowering switch 27, the suspension suppression mode (Suspension OFF) is selected (steps #206 to #209) at the same time that floating control is carried out in preference to the draft control only while the lowering control signal continues to be detected.

In this floating control, elevation is not carried out by the driving of the lift cylinder 10 and the action of lowering the plow P is carried out under gravity of its own. Therefore, lowering is stopped when a balance is achieved between resistance acting from the ground surface (underground) and the weight of the plow P, and the plow P is allowed to move vertically in accompaniment with the fluctuations of resistance that acts from the ground surface (underground). "Deep plowing" work is thereby achieved, and a transition is thereafter made to the draft control when operation of the lowering switch part 27b has been terminated.

The lowering switch part 27b of the forced elevating/lowering switch 27 is continuously operated, whereby the transition to floating control is carried out while detection of the lowering control signal continues, and when floating control is carried out, the mode switching means 70 selects the suspension suppression mode (Suspension OFF). The draft control is carried out (restored) at the timing that occurs when the operation of the lowering switch part 27b is terminated and the lowering control signal has reached non-detection; and control is carried out to transition to the suspension function mode (Suspension ON) (step #209).

When the draft control is carried out thereafter, the suspension switching control is carried out when the lowering switch part 27b is not pressably operated (steps #300, #210). The suspension switching control (step #300) is either one of the control in steps #07 to #11 in FIG. 7, or the control shown in steps #107 to #113 in FIG. 10. When either one is carried out, the suspension function mode (Suspension ON) and the suspension suppression mode (Suspension OFF) are suitably selected.

In this manner, the suspension suppression mode (Suspension OFF) is carried out and the pitching of the traveling vehicle body A is suppressed even when the lowering switch part 27b of the forced elevating/lowering switch 27 is continuously operated to thereby transition to floating control.

FIG. 8 shows the mode switching of the suspension control unit D that corresponds to changes in the draw load value, and the suspension function mode (Suspension ON) is maintained when the draw load value is included in the dead zone E, as shown in the drawing. The suspension suppression mode (Suspension OFF) is selected when the raise control signal for forcibly raising the plow P in a state of the draft control has been detected, when the plow P in a raised position is lowered (forced lowering), and when the raise control signal is detected due to the draw load value exceeding the upper limit value Eu of the dead zone E. As described above, when the draw load value detected by the draw load sensor S has fallen below the lower limit value Ed of the dead zone E (the timing indicated by "Y" in FIG. 8), a control signal for lowering the plow P is outputted, the plow P is lowered in accordance with this signal, but the suspension function mode (Suspension ON) is maintained. The reason why the suspension function mode is maintained when the plow P is lowerably controlled in this manner is as follow. Since the lift cylinder 10 is a single-acting cylinder; and when the plow P is lowered under gravity of its own, the process is carried out gradually and slowly while the hydraulic fluid discharges from the lift cylinder 10, and thus pitching in the traveling vehicle body A hardly occurs.

(Functions and Effects of the Embodiments)

In such a configuration, when the draw load value detected in draft work by the draw load sensor S exceeds the upper limit value Eu of the dead zone E and the raise control signal is detected while the suspension mechanism C is set in the suspension function mode to thereby achieve travel with good riding comfort, the suspension mechanism C is set in the suspension suppression mode, whereby the weight of the front wheels 1, the front axle case 18, and the like is made to act on the front part of the traveling vehicle body A, pitching in which the front part is lifted upward is suppressed, and degradation of riding comfort is suppressed.

Furthermore, when the plow P is in the raised position, the suspension mechanism C is set in the suspension function mode, whereby travel with good riding comfort is achieved. As described above, when the lowering control signal for lowering the plow P is detected while the plow P is in a raised position, or when the raise control signal for raising the plow P has been detected, the suspension mechanism C is set in the suspension suppression mode, whereby pitching of the traveling vehicle body A that accompanies the elevating/lowering of the plow P is suppressed and degradation of riding comfort is suppressed.

Other Embodiments

Apart from the embodiments described above, the present invention may be configured as described under.

(a) As the draft control, a control mode of the draft control may be set in which the plow P is elevated and lowered so that a target draw load value set using a dial or other manipulative operation, and a draw load value detected by the draw load sensor S are made to conform. In such control that a control target is set in this manner using a dial or other manipulative operation, a dead zone is set using the target draw load value as a reference. When the draw load value detected by the draw load sensor S has exceeded the dead zone and a raise control signal has been outputted from the draft control means 68, the mode switching means 70 detects the raise control signal and the suspension suppression mode is selected.

(b) Similar configurations are described above in the embodiments. Instead thereof, as a configuration for suppressing the feeding and discharging of hydraulic fluid to and from the hydraulic cylinders 19 in the suspension suppression mode, a valve opening degree may be arbitrarily set by modifying the duty ratio of the power fed to a solenoid valve that opens and closes under electrical control. When a solenoid valve having such a configuration is used, it becomes possible to select between a state in which the feeding and discharging of hydraulic fluid to and from the hydraulic cylinders 19 is completely blocked, and a state in which the feeding and discharging rate of the hydraulic fluid to and from the hydraulic cylinders 19 is limited. When the feeding and discharging rate of hydraulic fluid is limited, the feeding and discharging rate can be modified by setting the valve opening degree.

(c) In the draft control, it is also possible to provide a switch or the like that makes it possible to select a state in which the mode switching means 70 is made to function so as to select between the suspension function mode (Suspension ON) and the suspension suppression mode (Suspension OFF); and a state in which the functioning of the mode switching means 70 is stopped in the draft control, whereby the suspension suppression mode (Suspension OFF) is constantly maintained.

(d) As the suspension mechanism C, it is also possible to employ a structure in which the right and left front wheels 1 are independently suspended and the right and left hydraulic cylinders 19 independently extend and contract, and to combine this structure with the remaining configurations of the present invention as described above. With such a modified configuration, it is also possible to suppress pitching in which the front part of the traveling vehicle body A is lifted upward, and suppress degradation of riding comfort.

(e) A plow P is coupled as a ground implement to the rear part of the traveling vehicle body A in the foregoing embodiments. Instead therof, a subsoiler, a subsoiling plow or another ground implement may be coupled to the rear part of the traveling vehicle body A for carrying out tilling work in a drawn-by-tractor mode.

(f) As the control mode carried out by the mode switching means 70, it is also possible to switch over between the suspension suppression mode and the suspension suppression mode so that transition is made the suspension suppression mode for a set period of time when the travel speed is high in excess of a threshold value; and so that transition is made to the suspension suppression mode in an area for traveling a set distance when the travel speed is less than a threshold value; or performing another transition.

(g) Finally, as industrial applicability, the present invention can be generally used in all tractors in which a hydraulic cylinder that extends and contracts in coordination with the vertical movement of the front wheels is made to function as a suspension.

What is claimed is:
1. A tractor comprising:
a traveling vehicle body, the traveling vehicle body having front wheels, the traveling vehicle body being configured to have a ground implement connected thereto;
a lift actuator elevating/lowering the ground implement coupled to the traveling vehicle body;
a suspension mechanism supporting the front wheels;
a draw load sensor detecting a draw load value of the ground implement connected to the traveling vehicle body;

draft control means performing draft control, when the ground implement is in a work position, by controlling the lift actuator based on the draw load value detected by the draw load sensor; and mode switching means selecting one of a suspension suppression mode and a suspension function mode with respect to the suspension mechanism, wherein a suspension function of the suspension mechanism is limited or stopped in the suspension suppression mode, and a suspension function of the suspension mechanism is activated in the suspension function mode, wherein the draft control means is configured to generate a raise control signal for controlling the lift actuator to elevate the ground implement; and wherein during the draft control while the ground implement is in the work position, the mode switching means is configured to select the suspension function mode based on non-detection of the raise control signal as long as the draw load value is within its dead zone, and to select the suspension suppression mode based on detection of the raise control signal when the draw load value has exceeded an upper limit value of the dead zone.

2. The tractor according to claim 1, wherein
the ground implement comprises a drawn soil tiller; and
wherein the draw load sensor is configured to detect the draw load value of the drawn soil tiller in a state in which the drawn soil tiller is coupled to a rear part of the traveling vehicle body.

3. The tractor according to claim 2, wherein
in a case where a transition has been made from the draft control to forced raising control for forcibly raising the drawn soil tiller to a height out of contact with the ground, the mode switching means selects the suspension suppression mode based on detection of the raise control signal.

4. The tractor according to claim 1, wherein
the suspension mechanism includes a hydraulic cylinder that extends and contracts in accompaniment with a vertical action of the front wheels, a suspension control unit for controlling feeding of hydraulic fluid to, and discharging of hydraulic fluid from, the hydraulic cylinder, and suspension control means for controlling the suspension control unit; and
the mode switching means limits or obstructs feeding of hydraulic fluid to, and discharging of hydraulic fluid from, the hydraulic cylinder according to control of the suspension control means to bring about the suspension suppression mode.

5. The tractor according to claim 1, wherein
the draft control means is configured to generate a lowering control signal for controlling the lift actuator to lower the ground implement; and
during the draft control, the mode switching means is configured to select the suspension function mode based on detection of the lowering control signal when the draw load value has reached a value that is less than a lower limit value of the dead zone from within the dead zone.

6. The tractor according to claim 1, wherein
during the draft control while the ground implement is in the work position, the mode switching means is configured to select the suspension suppression mode for a set period of time from detection of the raise control signal, and to select the suspension function mode after lapse of the set period of time.

7. The tractor according to claim 1, wherein
when forced lowering control for forcibly lowering the ground implement from the raising position has been started, the mode switching means is configured to select the suspension suppression mode as long as a lowering control signal for actuating the lift actuator to lower the ground implement is detected, and to select the suspension function mode based on non-detection of the lowering control signal.

8. A tractor comprising:
a traveling vehicle body, the traveling vehicle body having front wheels, the traveling vehicle body being configured to have a ground implement connected thereto;
a lift actuator elevating/lowering the ground implement coupled to the traveling vehicle body;
a suspension mechanism supporting the front wheels;
a draw load sensor detecting a draw load value of the ground implement connected to the traveling vehicle body;
draft control means performing draft control, when the ground implement is in a work position, by controlling the lift actuator based on the draw load value detected by the draw load sensor; and
mode switching means selecting one of a suspension suppression mode and a suspension function mode with respect to the suspension mechanism, wherein a suspension function of the suspension mechanism is limited or stopped in the suspension suppression mode, and a suspension function of the suspension mechanism is activated in the suspension function mode,
wherein the draft control means is configured to generate a raise control signal for controlling the lift actuator to elevate the ground implement; and
wherein during the draft control while the ground implement is in the work position, the mode switching means is configured to select the suspension suppression mode for a set period of time from detection of the raise control signal, and to select the suspension function mode after lapse of the set period of time.

9. The tractor according to claim 8, wherein
the ground implement comprises a drawn soil tiller; and
wherein the draw load sensor is configured to detect the draw load value of the drawn soil tiller in a state in which the drawn soil tiller is coupled to a rear part of the traveling vehicle body.

10. The tractor according to claim 9, wherein
in a case where a transition has been made from the draft control to forced raising control for forcibly raising the drawn soil tiller to a height out of contact with the ground, the mode switching means selects the suspension suppression mode based on detection of the raise control signal.

11. The tractor according to claim 8, wherein
the suspension mechanism includes a hydraulic cylinder that extends and contracts in accompaniment with a vertical action of the front wheels, a suspension control unit for controlling feeding of hydraulic fluid to, and discharging of hydraulic fluid from, the hydraulic cylinder, and suspension control means for controlling the suspension control unit; and
the mode switching means limits or obstructs feeding of hydraulic fluid to, and discharging of hydraulic fluid from, the hydraulic cylinder according to control of the suspension control means to bring about the suspension suppression mode.

12. The tractor according to claim 8, wherein when forced lowering control for forcibly lowering the ground implement from the raising position has been started, the mode switching means is configured to select the suspension suppression mode as long as a lowering control signal for actuating the lift actuator to lower the ground implement is detected, and to select the suspension function mode based on non-detection of the lowering control signal.

13. The tractor according to claim 12, wherein
the ground implement comprises a drawn soil tiller;
wherein the draw load sensor is configured to detect the draw load value of the drawn soil tiller in a state in which the drawn soil tiller is coupled to a rear part of the traveling vehicle body; and
wherein a lowering switch part is provided for outputting the lowering control signal for causing the drawn soil tiller to be lowered under gravity in preference to control of the draft control means, the mode switching means selecting the suspension suppression mode in a case where the lowering control signal is continuously outputted from the lowering switch part.

14. The tractor according to claim 12, wherein
the suspension mechanism includes a hydraulic cylinder that extends and contracts in accompaniment with a vertical action of the front wheels, a suspension control unit for controlling feeding of hydraulic fluid to, and discharging of hydraulic fluid from, the hydraulic cylinder, and suspension control means for controlling the suspension control unit; and
the mode switching means limits or obstructs feeding of hydraulic fluid to, and discharging of hydraulic fluid from, the hydraulic cylinder according to control of the suspension control means to bring about the suspension suppression mode.

* * * * *